United States Patent
Klein et al.

(10) Patent No.: US 11,526,602 B2
(45) Date of Patent: Dec. 13, 2022

(54) DATA-PROCESSING DEVICE, COMPLETE ENTITY, AND METHOD FOR OPERATING A DATA-PROCESSING DEVICE OR COMPLETE ENTITY

(71) Applicant: AUDI AG, Ingolstadt (DE)

(72) Inventors: Markus Klein, Pförring (DE); Kamil Zawadzki, Munich (DE); Changsup Ahn, Ingolstadt (DE); Hans Georg Gruber, Ingolstadt (DE); Jürgen Lerzer, Neumarkt (DE); Christoph Dalke, Kipfenberg (DE)

(73) Assignee: Audi AG, Ingolstadt (DE)

( * ) Notice: Subject to any disclaimer, the term of this patent is extended or adjusted under 35 U.S.C. 154(b) by 122 days.

(21) Appl. No.: 16/757,672

(22) PCT Filed: Dec. 4, 2018

(86) PCT No.: PCT/EP2018/083421
§ 371 (c)(1),
(2) Date: Apr. 20, 2020

(87) PCT Pub. No.: WO2019/110552
PCT Pub. Date: Jun. 13, 2019

(65) Prior Publication Data
US 2020/0334355 A1 Oct. 22, 2020

(30) Foreign Application Priority Data
Dec. 5, 2017 (DE) .................. 10 2017 221 889.4

(51) Int. Cl.
*G06F 21/55* (2013.01)
*G06F 13/38* (2006.01)
(Continued)

(52) U.S. Cl.
CPC .......... *G06F 21/554* (2013.01); *G06F 13/387* (2013.01); *G06F 21/31* (2013.01); *G06F 21/62* (2013.01); *G06F 2213/0026* (2013.01)

(58) Field of Classification Search
CPC ....... G06F 21/30–36; G06F 21/50–577; G06F 21/60–645; G06F 13/387; G06F 2213/0026
See application file for complete search history.

(56) References Cited

U.S. PATENT DOCUMENTS 9,509,717 B2 * 11/2016 Stute ................ H04L 63/045
9,582,669 B1 2/2017 Shen et al.
(Continued)

FOREIGN PATENT DOCUMENTS

CN 101014923 A 8/2007
CN 202009400 U 10/2011
(Continued)

OTHER PUBLICATIONS

Clark, Christopher R., and Craig D. Ulmer. "Network intrusion detection systems on FPGAs with on-chip network interfaces." Applied Reconfigurable Computing 2005 (2005): 31. (Year: 2005).*
(Continued)

*Primary Examiner* — Madhuri R Herzog
(74) *Attorney, Agent, or Firm* — Sterne, Kessler, Goldstein & Fox P.L.L.C.

(57) ABSTRACT

A data-processing device includes a computing unit and an interface unit using a packet-based communication protocol, in particular PCI Express. The data-processing device also includes an intrusion detection unit that is connected via a signal connection to a filter device of the interface unit, and/or to a secure element, in the form of a Trusted Execution Environment, of an authentication arrangement related to the communication protocol. The intrusion detection unit
(Continued)

evaluates input signals received via the signal connection for a rule infringement in a set of intrusion detection rules The filter device, at least part of which is hardware, is designed to forward only the communication data meeting an approval condition from the interface unit to an additional component of the data-processing device according to configuration information predetermined in the data-processing device and containing the approval condition. At least one intrusion detection rule relates to the infringement of the approval condition and/or to an authentication error.

20 Claims, 3 Drawing Sheets

(51) Int. Cl.
*G06F 21/31* (2013.01)
*G06F 21/62* (2013.01)

(56) References Cited

U.S. PATENT DOCUMENTS

| | | | |
|---|---|---|---|
| 10,841,278 B2 * | 11/2020 | Meriac | H04L 63/1441 |
| 2003/0145226 A1 * | 7/2003 | Bruton, III | H04L 63/0263 709/224 |
| 2006/0059372 A1 | 3/2006 | Fayar et al. | |
| 2011/0060913 A1 * | 3/2011 | Hird | H04L 9/3228 713/184 |
| 2011/0173490 A1 | 7/2011 | Narayanaswamy et al. | |
| 2013/0139245 A1 | 5/2013 | Thomas | |
| 2014/0089202 A1 * | 3/2014 | Bond | G06F 21/31 713/166 |
| 2014/0108791 A1 * | 4/2014 | Sinclair | G09C 1/00 713/164 |
| 2014/0195808 A1 | 7/2014 | Lortz et al. | |
| 2016/0050189 A1 | 2/2016 | Stute | |
| 2016/0275290 A1 | 9/2016 | Kotary et al. | |
| 2017/0147523 A1 | 5/2017 | Nakayama et al. | |
| 2017/0295182 A1 * | 10/2017 | Teshler | H04L 63/10 |
| 2020/0334355 A1 | 10/2020 | Klein et al. | |

FOREIGN PATENT DOCUMENTS

| | | | |
|---|---|---|---|
| CN | 102404169 A | 4/2012 | |
| CN | 107181738 B * | 9/2020 | G06F 21/56 |
| DE | 10241974 A1 | 3/2004 | |
| DE | 102017213010 A1 | 1/2019 | |
| DE | 102017214624 A1 | 2/2019 | |
| DE | 102017219242 A1 | 5/2019 | |
| EP | 3291119 A1 * | 3/2018 | G06F 21/554 |
| JP | 201971572 A * | 5/2019 | H04L 9/32 |
| KR | 20040079515 A | 9/2004 | |
| KR | 20070011736 A * | 1/2007 | |
| KR | 100750377 B1 * | 8/2007 | |
| WO | WO-2010144815 A2 * | 12/2010 | B60R 25/04 |
| WO | WO 2010144815 A2 | 12/2010 | |
| WO | WO 2019/110552 A1 | 6/2019 | |

OTHER PUBLICATIONS

International Preliminary Report on Patentability and Written Opinion of the International Searching Authority directed to related International Patent Application No. PCT/EP2018/083421, completed Oct. 25, 2019, with attached English-language translation; 11 pages.

International Search Report, and Written Opinion of the International Searching Authority directed to related International Patent Application No. PCT/EP2018/083421, with certified English-language translation of Written Opinion, dated Mar. 7, 2019; 19 pages.

* cited by examiner

|     | P1 | P2 | P3 | P4 | P5 | P6 | P7       | P8       | P9  | P10 | P11 |
|-----|----|----|----|----|----|----|----------|----------|-----|-----|-----|
| L1  | 00 | FF | 00 | F8 | 00 | 07 | 00000003 | FFFFFFFF | 001 | 3FF | 200 |
| L2  | 00 | F0 | 00 | F0 | 00 | 07 | 00000003 | FFFFFFFC | 001 | 3FF | 30  |
|     |    |    |    |    | ⋮  |    |          |          |     |     |     |
| L15 | 00 | 02 | 00 | 20 | 00 | 02 | 00000003 | 0000FFFC | 001 | 002 | 2   |
| L16 | 00 | 01 | 00 | 10 | 00 | 01 | 00000003 | 00000003 | 001 | 001 | 1   |
|     |    |    |    |    | ⋮  |    |          |          |     |     |     |

DATA-PROCESSING DEVICE, COMPLETE ENTITY, AND METHOD FOR OPERATING A DATA-PROCESSING DEVICE OR COMPLETE ENTITY

TECHNICAL FIELD

The present disclosure relates to a data-processing device comprising at least one computing unit and at least one interface unit using a packet-based communication protocol, in particular PCI (Peripheral Component Interconnect) Express, a complete entity with a plurality of data-processing devices and a method for operating a data-processing device or complete entity.

BACKGROUND

Modern data-processing systems as part of complete entities, for example motor vehicles, are increasingly complex today due to higher performance demands on these data-processing systems and the technological possibilities for the optimization of these data-processing systems. Data-processing systems of complete entities such as motor vehicles usually consist of a plurality of data-processing devices, which themselves may have high performance capabilities. A fast and straightforward data transmission between the data-processing devices via appropriate communication connections must be ensured as well, however. Technologies used for commercially available personal computers are also increasingly used in other complete entities such as motor vehicles. Such techniques include, in particular, packet-based point-to-point communication standards, in particular the PCI (Peripheral Component Interconnect) Express communication standard (PCIe communication standard), which is generally used in a personal computer, for example, to connect peripheral devices to a chipset. PCI Express is one of the fastest communication methods available. Typical use cases for PCI Express are applications in which large amounts of data must processed and/or transmitted in extremely short times. In order to establish connections, for example between a chipset and a plurality of peripheral devices, bridge devices are often interposed. These can be designed, for example, as a multiplexer/demultiplexer, switch, hub or the like. Such bridge devices can be "transparent" or "non-transparent," which means that they act directly as a communication partner or that they can make a data-processing device that can be reached via the bridge device appear as a direct communication partner. A plurality of different architectures are possible and known.

In the case of a data-processing device, the communication connection is usually designed via corresponding input/output control units, which can also be referred to as interface units, for example a PCIe microchip. Bridge devices (switches, hubs, multiplexers, demultiplexers) can be designed as a single microchip ("system on a chip" or SoC) or as a multi-chip device. The actual communication partners (data-processing devices) are usually referred to as "endpoints" and may include an operating system and/or a driver, wherein the interrupt and read/write operations can be performed by the driver.

When using communication standards such as PCI Express, the communication partners usually have direct access to storage device and computing units of the data-processing devices communicating with them. This also applies if complete entities or their data-processing systems have security-critical components which are to communicate with less security-critical areas. Motor vehicles are capable, for example, of considering driving and/or safety system-related control devices, in particular those relating to autonomous driving, as safety-critical data-processing devices, which must therefore be assigned to a security area but which are supposed to communicate with data-processing devices that are classified as less security-critical, in particular further control devices.

The provision of a bidirectional connection, which allows access to storage device and/or computing units in the security-critical data-processing device, would, however, allow data-processing devices classified as less security-critical and acting as communication partners to manipulate the security-critical data-processing device, for example when the less security-critical communication partner has been hacked or replaced and/or the communication data was manipulated during transmission via the communication link.

While it would be possible to consider rather disadvantageous monodirectional communication connections or restricted return channels instead, applicant's post-published German patent application DE 10 2017 214 624.9 proposes a method for filtering communication data that is transmitted from a communication partner to the data-processing device via a communication connection that provides access to at least one storage medium of a receiving data-processing device in which a communication-receiving interface unit comprising, preferably an input/output control unit and an input/output unit, of the data-processing device, wherein a filter device, at least part of which is hardware, only forwards communication data meeting at least one approval condition, which evaluates at least one characteristic of the user data contained in the communication data, from the interface unit to at least one additional component of the data processing device according to configuration information predetermined in the data processing device. A hardware-based firewall is thus present in the form of a filter device, which is implemented by an interface unit, for example a PCIe control chip. Based on the configuration information, the filter device is able to reduce the user data available, in particular control signals, which are transmitted to the relevant components, in particular the storage device and/or the computing unit, to only what is necessary and safe. This way, the intrusion risk that the communication connection represents is minimized without having to forego a fully functional return channel.

The problem with complete entities such as motor vehicles, which differ significantly from personal computers, is that their data-processing systems are based on a modular concept with the communication connections being physically accessible for intrusions. In turn, this means that unauthorized data-processing devices such as control devices can also access the communication connections and import their own user data, which may not meet the requirements for automotive quality and/or safety. This means that a compromised and/or added "endpoint" may pose a security problem to the rest of the data-processing system as well. This applies especially to communication standards that allow direct access to components of communication partners such as storage device and the like.

To improve on this, the post-published German patent application DE 10 2017 213 010.5 proposes a complete entity with an authentication arrangement relating to a communication connection between two data-processing devices of the complete entity using a communication protocol, wherein the data processing devices each comprise an input/output control unit for the communication connection as well as a computing unit, in particular a CPU, a GPU, a FPGA, an AIC, or any combination thereof, wherein each input/output control unit comprises a cryptographic encryption/decryption device, at least part of which is hardware, for encrypting at least some of the user data to be transmitted via the communication connection as part of the authentication arrangement with the encryption/decryption device being applied in a particularly non-application-oriented communication layer of the communication protocol to the user data prepared for the physical user data transmission or to the physically received user data, wherein each data-processing device has a secure element, implemented as dedicated hardware which the computing unit cannot access and/or implemented in a manner that logically isolates it from the computing unit, and produces a Trusted Execution Environment with the secure element of the authentication arrangement comprising at least one piece of hardware-encoded key information on the basis of which the user data is encrypted by the encryption/decryption device. What is proposed, therefore, is an authentication arrangement which is hardware and thus less susceptible to manipulations and which, due to its ability to provide secure communication via the communication connection, allows for a reciprocal authentication of the data-processing devices at least implicitly but preferably in an authentication process. This is possible due to the hard-coded key information in the hardware of the secure element, which cannot be accessed by the computing unit with the hard-coded key information being adapted for at least one pair of data-processing devices each to be authenticated against one other, wherein the encryption information for a pair of communicating data-processing devices can be based on symmetric encryption or on asymmetric encryption. In the case of a symmetric encryption, the encryption information comprises at least one identical base key, preferably for all data-processing devices. In the case of an asymmetric encryption, each key information contains at least its own private key and the public keys of all provided communication partners to be authenticated.

So-called "intrusion detection systems" (IDS) have already been proposed in software-based systems. An IDS is used to identify compromised systems and to provide the ability to react to a compromised system that has been intruded (IPS or intrusion prevention system). An IDS adds more software to a complete entity and thus provides additional intrusion paths which must also be taken into consideration with regard to security when a risk analysis is performed. In addition, such IDSs lead to a loss of performance because computing power is required for the corresponding software means realizing the IDS. Applicant's post-published German patent application DE 10 2017 219 242.9, seeking to realize an improved IDS in a system-on-a-chip for such a system-in-chip comprising a plurality of computing units, in particular computer cores and/or CPUs, at least one input/output unit, one storage unit and an input/output control unit that coordinates the communication between the computing units and the at least one input/output unit, wherein the system-on-a-chip further has an intrusion detection unit made of hardware, which is connected by means of a hardware signal connection to at least the input/output control unit as a component of the system-on-a-chip and evaluates input signals received from the input/output control unit for a rule infringement in a set of intrusion detection rules, the rule infringement having to be logged and/or responded to with at least one measure. The intrusion detection unit thus forms part of an IDS or even an IDPS (Intrusion Detection and Prevention System). Signals from preferably a plurality of components of the system-on-a-chip, comprising at least the input/output control unit, are used and evaluated for a possible intrusion, ideally completely independently of the remaining operation of the system-on-a-chip, which makes it possible, in particular, to give a hacker the illusion that the activity of the hacker has not yet been detected. Additional hardware is therefore added within the system-on-a-chip, which comprises at least hardware signal connections from different hardware-based components of the system-on-a-chip to a separated IDS. The use of such a separated IDS avoids the use of pure, vulnerable software and therefore does not add any new points of intrusion because the IDS works via the additional, otherwise unused hardware signal connections and ideally does not interact with the other computing units in a manner that allows for the reception of data or an intrusion. As a result, there is also minimal influence on existing security mechanisms, and it is ensured that the IDS itself is provided in a secure area of the single-chip system. The detection of an intrusion or corruption of the system-on-a-chip cannot be hidden behind an infected part of a system-on-a-chip, particularly a part that has already been taken over; the use of separate, preferably additional, hardware also makes it possible to implement IDS without sacrificing the computing power of the computing units.

In spite of these suggestions, there is further need for improvement for the data-processing device of a complete entity, in particular a motor vehicle.

DETAILED DESCRIPTION

Figure 1:
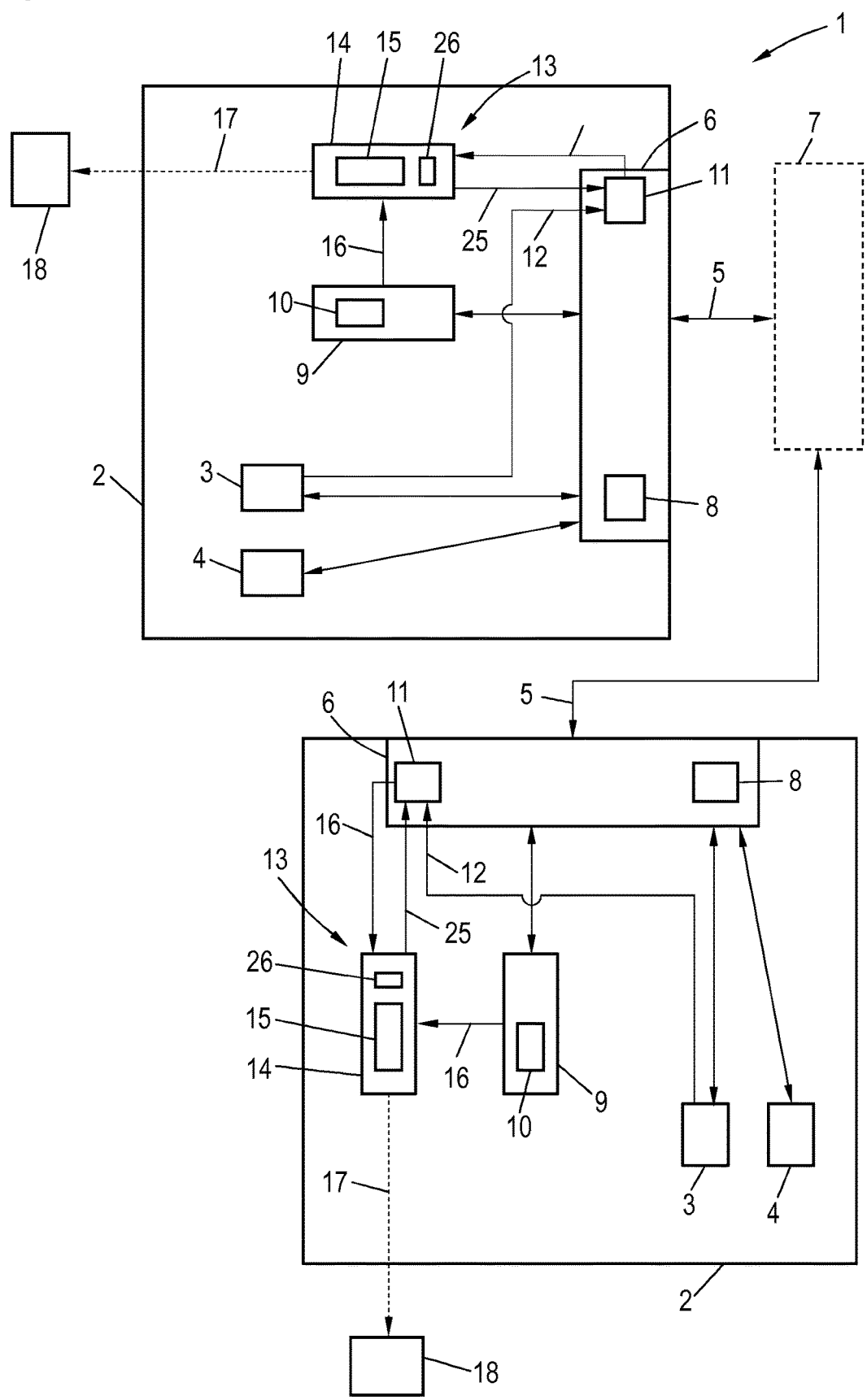
FIG. 1 shows a schematic diagram of a first complete entity, according to some embodiments of the present disclosure.

The present disclosure is based on the object of providing a data-processing device which is further improved with regard to its security and/or the traceability of intrusions as well as an even more improved data-processing system of a complete entity.

To achieve this object, the present disclosure provides a data-processing device, a complete entity and a method for operating the same.

According to the present disclosure, a data-processing device of the type referenced above further comprises an intrusion detection unit, in particular made from hardware, which is connected via at least one signal connection, preferably a hardware signal connection, with a filter device of the interface unit and/or a secure element in the form of a Trusted Execution Environment of an authentication arrangement related to the communication protocol. The intrusion detection unit evaluates input signals received via the at least one signal connection for a rule infringement of a set of intrusion detection rules which needs to be logged and/or responded to with at least one measure. The filter device, at least part of which is hardware, is designed to forward only the communication data meeting at least one approval condition that evaluates the at least one property of the communication data containing user data received from the interface unit, to at least one additional component of the data-processing device, according to configuration information predetermined in the data-processing device and containing at least one approval condition. At least one intrusion detection rule relates to the violation of at least one approval condition and/or to an authentication error.

While new hardware, in particular the secure element and the filter device, was proposed in the previously cited German patent applications DE 10 2017 214 624.9 and DE 10 2017 213 010.5 to achieve the highest security standards and a strong separation between security-relevant and less security-relevant areas, in particular communication partners, it is extremely important on the one hand to determine that the data-processing system is being intruded. On the other hand, however, it has also been shown that information generated in the additional hardware which performs the authentication/encryption and the information generated by the filter mechanisms is particularly suitable for implementing an intrusion detection for the communication protocol, preferably PCIe (Peripheral Component Interconnect Express). A particularly high synergy potential was found, which is used according to the present disclosure to match the set of intrusion detection rules with the protective mechanisms of the filter device and/or the secure element, which means that infringements of the rule sets can be transferred directly to a corresponding intrusion detection. Preferably, an intrusion detection unit is used. The intrusion detection unit is a hardware that is separate from the interface unit and the at least one computing unit and that is connected to the sources of the input. The intrusion detection unit is connected with the sources of the input signals via hardware signal connections. No control commands affecting in particular the operation of the intrusion detection unit are accepted. This way, the implementation is extremely difficult to manipulate. It is further preferred that the IDS realized by the intrusion detection unit, in particular the PCIe IDS, has a passive configuration in order to not influence the performance of the data-processing device and its functionality to the greatest extent possible. The intrusion detection unit ultimately detects what is happening in the secure element and/or the filter device via the input signals and analyzes these processes by using the set of intrusion detection rules. Malfunctions such as authentication errors and/or encryption errors are forwarded by the secure element as input signals to the intrusion detection unit. Infringements of the approval conditions, for example, the fact that a permissible communication data throughput is exceeded, is provided for messages processed in the transport layer, or the messages themselves are provided by the filtering device as input signals.

The secure element and/or the intrusion detection unit and/or the filter device can be designed in accordance with the post-published patent applications DE 10 2017 214 624.9, DE 10 2017 213 010.5 and DE 10 2017 219 242.9, which were already mentioned at the beginning and are incorporated into this disclosure by reference.

In some embodiments, the authentication arrangement comprises encryption/decryption device of the interface unit for the encryption of at least a part of the user data transmitted via a communication connection with a further data-processing device. The encryption/decryption device in a communication layer of the communication protocol is applied to the prepared user data transmitted for the physical user data and/or the physically received user data. The encryption/decryption device comprises separate hardware, which the computing unit cannot access, and/or which is logically isolated from the secure element implemented by the computing unit with a hardware-coded key information, and on the basis of which the encryption/decryption device is encrypted.

The authentication arrangement, which is hardware and thus less susceptible to manipulation, allows, due to the possibility of a secure communication via the communication connection, for a reciprocal authentication of the data-processing devices at least implicitly but preferably in an authentication process. This is based on the hard-coded key information in the hardware of the security unit, which cannot be accessed by the computing unit. The hard-coded key information is adaptable for at least one pair of data-processing devices with each to be authenticated against one other. The encryption information for a pair of communicating data-processing devices can be based on symmetric encryption or on asymmetric encryption. In the case of a symmetric encryption, the encryption information comprises at least one identical base key, preferably for all data-processing devices. In the case of an asymmetric encryption, each key information contains at least its own private key and the public keys of all provided communication partners to be authenticated.

In this case, as indicated, the authentication can essentially and implicitly be performed by the encryption concept described herein, wherein an explicit authentication process can preferably be used, particularly at the beginning of each communication session in the course of or in addition to the negotiation of a session key or entirely without a key negotiation. Any generally known authentication processes can be used. Expediently, an authentication takes place at the beginning of a communication session, after which a negotiation of a session key takes place upon successful authentication. Unauthenticated data-processing devices, such as correspondingly compromised and/or replaced data-processing devices, are "not understood," unable to authenticate themselves, or discovered by the absence of any encryption. The present disclosure therefore ensures that only authorized data-processing devices (i.e. those having matching/adapted key information) can communicate as intended. The resulting errors, particularly in the event of an intrusion, can be reported to the intrusion detection unit as input signals.

It can, therefore, be specifically provided in the context of the disclosure that at least one of the input signals transmitted from the secure element to the intrusion detection unit describes an authentication error and/or an encryption error.

The secure element creates a Trusted Execution Environment (TEE). In addition to the hardware-encoded key information, the secure element also includes a hardware-produced and/or isolated operating system, for the key management and possibly the execution of an authentication process and/or key negotiation where a session key is to be negotiated for the current communication session, which will be described in more detail below. The operating system can also be designed to select, compile and/or forward the input signals for the intrusion detection unit.

A corresponding operating system realized by hardware is preferred, in particular because of its small intrusion surface. In some embodiments, at least the part of the secure element that generates the input signals for the intrusion detection is hardware. In this way, transmission of the input signals can always be ensured even in the event of an intrusion.

In some embodiments, the secure element as a Trusted Execution Environment which contains and manages key information and a cryptographic encryption/decryption device which lies as close as possible to the user data to be transmitted physically, particularly in a transport layer and/or a communication layer, are provided as new components of an authentication arrangement. With the Trusted Execution Environment, the secure element thus provides an execution context that is isolated at least from a normal operating system of the data-processing device. The key management and the secure storage of the key information are supposed to take place in the secure element in the same way as potentially provided secure calculations such as key generation, authentication process, key negotiation (key agreement) and the compilation of input signals to be transmitted to the intrusion detection unit.

In summary, this results in a strong authentication of each data-processing device of the complete entity that can be monitored for intrusions, particularly of the motor vehicle, with the option of extending the data-processing system of the motor vehicle with authorized partners. Suitable key information to be hardware-encoded can, for example, be passed on to appropriate cooperation partners. In this case, the term "hardware-encoding" means that the keys are written into the secure element, possibly in the form of a circuit, and subsequently designed with known means to be unalterable.

Unknown third-party data-processing devices can be avoided because the secure communication is impossible and/or because the authentication/negotiation of session keys fails. Corresponding intrusions are reliably detected by the intrusion detection unit as well. Due to the outsourcing of the authentication in hardware components, the quality inspection of software components of the data-processing devices is simplified because the authentication takes place at a hardware level. The authentication arrangement allows for the prevention of physical modification measures and intrusions and their detection together with the intrusion detection unit, which is particularly advantageous for complete entities such as motor vehicles, because here the communication connections are relatively easy to access physically. As a result, the encrypted user data cannot be recognized by an external analysis means. Overall, the described concept must be labeled as application-transparent because all protection and detection mechanisms are implemented in hardware and possibly low-level software.

It must also be noted that various options exist for the actual hardware encoding of the key information. For example, it is conceivable that the key information is already determined by the manufacturer of the secure element and that it can be designed, for example, as a separate microchip and introduced into the secure element in a hardware-encoded manner. However, a manufacturer of the complete entity itself can also hardware-encode the key information, for example, in the case of a motor vehicle, at the end of the assembly line. For that purpose, a provisional master key is present within the secure element and that it can be used to supplement and hardware-encode the dedicated key information and finally lock the not yet closed microchip of the secure element ("fusing"). This applies both to symmetric key information and therefore particularly to common base keys as well as asymmetric key information.

In some embodiments, the communication layer is a transport layer and/or a transaction layer. In this example, PCI Express (PCIe) is selected as the communication protocol (communication standard) in which case the encryption/decryption device is preferably assigned to a transaction layer and is thus applied to the user data prepared for the physical transport and appropriately formatted, specifically TLPs (Transaction Layer Packages).

In some embodiments, in the packet-based communication protocol, only one, particularly dynamically or user-adjustable, portion of the user data packets to be transmitted is encrypted, wherein the encryption state in an information unit, particularly an encryption bit, of the header of the respective user data packet is displayed. In order to save encryption and decryption efforts, it is thus conceivable to perform only a partial encryption for which a corresponding encryption bit is preferably set accordingly within the header of the user data packets if an encryption is present. In general, this can also be called an encryption indicator. The rate of encryption can be selected by a user, for example predetermined by a manufacturer of the complete entity in a hardware-encoded manner, but it can also be dynamically adaptable, which means that the rate of encrypted user data packets can be selected on the basis of a desired data transmission rate for the user data. In this manner, a balance can be created between the security offered by encryption and the saving of expenditures for high data rates. In addition, an intrusion detection can also begin at this point, for example by checking whether too many or too few packets are encrypted with partial encryption. The corresponding input signals are generated for the intrusion detection unit.

In some embodiments, the secure element has at least one protection mechanism that protects the key information from being read. Special microchips have already been proposed, for example, in which stored circuit/key information becomes unreadable in case of a physical intrusion of the microchip. The secure element can be realized as a secure cryptoprocessor, for example, in which at least one physical security measure is provided as a protection mechanism. This is known, for example, from smart cards. Configurations in which the stored key information is automatically destroyed if the physical integrity of the secure element is destroyed are also conceivable as protection mechanisms. Protection mechanisms can also comprise shielding layers that prevent the reading of internal signals and the like.

It is generally conceivable to directly use the hardware-encoded key information in order to perform the decryption/encryption of the user data, making a negotiation of a session key to be used for a communication session unnecessary. However, with regard to the authentication, it has been found expedient if the authentication arrangement is designed for negotiating a session key to be used for a communication session on the basis of the key information, particularly after a reciprocal authentication performed in the course of an authentication process that uses the key information. In this case, the secure elements usually communicate via the communication connection in order to agree on a session key and, if necessary, to perform an authentication process separately. In this case, the key information serves as "shared information," which is to be used as the basis for the authentication and/or the negotiations and/or the generation of the session key in order to allow for the authentication by the authentication arrangements. For that purpose, different options for negotiating a key are conceivable, particularly also an asymmetric negotiation method such as the Diffie-Hellman method. It is also conceivable that the negotiation of the session key can be understood as an authentication process if no explicit authentication is connected upstream or interposed. In other words, the authentication process now provides the "session key."

In some embodiments, in the case of symmetrical key information which comprises at least one identical base key for each data-processing device, a plurality of base keys are provided and/or that the secure element is designed to derive different subkeys from the base key. There are many reasons for providing different base keys. The authentication can, for example, be adapted via the base keys according to further criteria. A different key can be provided, for example, for different models of the complete entity in order to also allow for a distinction in terms of the authentication. In general, a key to be used can be selected using a property of the complete entity and/or a usage parameter describing the use of the complete entity. In addition to the described example of the different models of the complete entity, it is also conceivable, for example, to provide region-specific base keys by means of which the different local circumstances can be taken into account and/or a locally different behavior can be effected. It is also conceivable to assign a certain durability and/or a certain interval to the keys so that, for example, base keys are available for specific validity intervals. In such case, the multiple base keys as a key tree are based on a non-stored and/or a secret root key that is never directly used. In this manner, the multiple base keys can thus be derived from a common, secret and thus specifically securable root key that does not even have to be used outside of the secure element. Consequently, the root key is not passed on to the outside of the secure element. A further increase in security is conceivable, for example, in that temporally valid base keys are derived from the root key and the like.

The use of several keys in particular can provide an excellent basis for coordinating the set of the intrusion detection rule, in particular if further information is available during the evaluation of the input signals or a subsequent, and possibly external, evaluation, for example about a current region, a current model of the complete entity and the like.

The secure element can be designed as a system-on-a-chip with the computing unit and/or the interface unit or as a separate security chip. Specifically, the secure element and/or the intrusion detection unit is designed as a trusted zone of the system-on-a-chip or as an embedded secure element of the system-on-a-chip or as a Trusted Platform Module (TPM). Even in the case of a system-on-a-chip (SoC), measures/mechanisms are now known that prevent access to a general operating system, for example, to an operating system of the computing unit and/or the interface unit, to a specific hardware segment, particularly a trusted zone and/or an embedded secure element. Technologies are known, for example, in which routine messages/operations are transmitted with 32-bit technology while in a trusted hardware segment of the system-on-a-chip a 33-bit is additionally used to identify the secure sections ("SecureBit"). Corresponding technologies can also be used within the scope of the present disclosure in order to allow for particularly compact and still secure embodiments of the data-processing device.

As far as the filter device is concerned, this is based on the idea of realizing a hardware-based firewall in the form of filter device in the receiving data processing unit considered security-critical or located in a security domain, which is realized on the part of an interface unit such as a PCIe control chip. The user data can, in particular, include control commands acting on the at least one storage device with the filter device being applied to at least the control signals. The approach described here can, however, also be applied to other user data in the communication data since it can also cause damage in the storage of a data-processing device and/or in a computing unit of a data-processing device of other user data. Based on the configuration information, the filter device can reduce the user data available, in particular control signals, which are transmitted to the relevant components, in particular a storage device and/or a computing unit, to only what is necessary and to a level that ensures security. This way, the intrusion risk the communication connection represents is minimized without having to forego a fully functional return channel. Messages/communication data that are not forwarded generally represent an excellent basis for analyzing an intrusion situation.

The configuration of the filter device is preferably carried out by the data-processing device itself, but it is possible to use a separate configuration channel within the data-processing device, in particular on the basis of the computing unit and/or an existing configuration interface of the interface unit. This means, however, that each data-processing device in a data-processing system of the complete entity has control over the incoming messages to be filtered out via the communication link. In contrast to an embodiment in which access to a monitoring device centrally opens up manipulation possibilities in the entire data-processing system, the filter device protects against incoming intrusions and provides maximum autonomy to the data-processing device as a subsystem.

In other words, this means that the data-processing device can use its own firewall in the form of the filtering device regardless of whether parts of the data-processing system are compromised. There is no master device that could change the firewall configuration information because only the data-processing device itself can change the configuration. Furthermore, each data-processing device can react to incoming intrusions and can reduce or even completely shut down the communication connection by appropriately reconfiguring the filter device.

Another significant advantage of the filter device provided is the fact that the content of the communication data, i.e., the user data (payload) can be assessed by the filter device and, if necessary, by the intrusion detection unit as well. While the approaches known from prior art can be referred to as a "stateless packet inspection," the present disclosure can be referred to as a "stateful packet inspection." It must therefore not or not only be determined which origin, which destination and which communication route the communication data took but also the content must be considered as well. Moreover, the user data does not necessarily have to be accessed directly, but it is conceivable that, in the case of packet-based communication, the corresponding properties of the communication data are contained in the header that the approval condition can access. The at least partial configuration of the filter device in hardware, in particular therefore the integration into a chip forming the interface unit, further limits the possibilities of manipulation.

Overall, the filtering of the communication traffic within the data-processing device itself but outside the computing unit and the storage device allows for a strict separation in distributed systems of data-processing devices. The filter device in the interface unit, in particular in an external chip, allows the use of simpler residual components, in particular computing units, for example CPUs, in security-critical data-processing devices as well which use the communication standard of the communication link. The outsourcing of the filter device into the interface unit thus reduces the complexity of the data-processing device itself. The mechanism described here can also be used in multiplexed/demultiplexed communication links. In particular, a bridge device that may be used does not have to have any information about the filtering processes.

In some embodiments, the filter device is used in a communication layer, in particular a transaction layer in PCI Express, which acts on the communication data formatted according to the communication standard used for the physical transport in the communication connection. Hardware-assisted filtering within the transaction layer is thus possible. This means that the filtering can be placed as close as possible to the physical reception of the communication data in order to minimize its influence on the data-processing device, in particular the storage device and/or the computing unit. In the transaction layer, the data still has the transmission format defined by the communication standard, here in particular PCI Express. If content, in particular user data, is to be accessed directly by at least one approval condition and if the user data is encrypted, such a filtering device would have to be provided immediately following suitable decryption device.

In some embodiments, a filter device implemented as part of a microchip which forms the interface unit is used as the filter device. In terms of hardware technology, the filter device can thus be implemented by modifying a corresponding interface unit microchip and can therefore be permanently integrated into the processing sequence on the hardware side. This can, in particular, be a PCIe chip.

The filter device is preferably exclusively configurable by the data-processing device itself as shown, and the filter device is designed, preferably exclusively, by the computing unit. The computing unit, for example a CPU, therefore preferably has exclusive configuration access to the filter device, which ensures the greatest possible autonomy and flexibility of the data-processing device, for example after intrusions are reacted to by tightening the approval conditions or completely deactivating the communication connection.

In some embodiments, at least one of the approval conditions evaluating at least one user data unit may include a minimum length and/or maximum length of a user data unit, in particular a control command, and/or a restriction of the type of function of a control command described by the user data and/or a restriction of the accessible storage area of the at least one storage device checked. A restriction of the permissible user data in the communication data can therefore first be defined, for example, via the length of a user data unit that is to be written, for example, into a storage area of the storage device. It can be assumed that the smaller a user data unit is, for example a control command, the less damage a harmful user data unit can do in the data-processing device. In the communication standard and/or via an appropriate configuration of the filter device, a distinction can also be made between different types of functions in control commands described by the user data. They can, for example, be classified in different ways so that an approval condition excludes certain types/classes of functions. This, in turn, excludes certain types of access, in particular to storage device, in the data-processing device, for example write access, manipulation access and the like. In some embodiments, provisions can be made to limit the storage area which the user data of the communication data may use, i.e., which they may be store. Due to their corresponding structure, user data/control commands often seek to use certain storage areas of the storage device of the data-processing device, which may possibly be particularly relevant for the security-critical functionality of the data-processing device, which is why such particularly security-critical areas can be excluded, for example, via an approval condition. In some embodiments, approval conditions are used for all of these criteria since in that case workaround solutions such as the fragmentation of general control commands in the event of size restrictions and the like can be avoided as well.

In addition to the content-related approval conditions, other approval conditions can also be used within the scope of the present disclosure. These evaluate a communication property describing the communication connection and/or the communication partner. In the PCI Express communication standard, for example, the respective communication partner is identified within the communication information in exactly the same way as the specifically used communication connection to this communication partner if several communication connections are used. The filter device can provide for restrictions in this regard as well, which is a generally known fact.

The input signals transmitted from the filter device to the intrusion detection unit should preferably be able to describe more precisely based on which infringement of at least one approval condition certain packets were rejected since certain combinations of properties can be characteristic for intrusions or the type of the intrusions. In particular, the approval conditions and/or the set of intrusion detection rules can be designed to be coordinated with one another in such a way that it is possible to classify intrusions in a particularly simple and reliable manner. Such rejection reasons may, in particular, also include the exceeding of a permissible communication data throughput. Another important resource for input signals is the rejected communication data itself, i.e., packets/messages. It is advantageous to be able to also consider the history of rejected communication data, in particular when evaluating the set of intrusion detection rules and/or external evaluations performed externally at a later point in time. For this purpose, the intrusion detection unit may, in particular, comprise a ring buffer in which a certain number of recently rejected communication data sets, in particular packets and/or messages, are kept. The respective number of these communication data sets may be made dependent on the currently valid approval conditions, for example that fewer messages are kept if less communication data is rejected, and more messages are kept if more communication data is rejected. In one example, the ring buffer can hold the last one hundred rejected communication data sets.

Statistical informational on communication data not forwarded due to the configuration information, for example how many communication data sets were rejected per time unit or the like, have been found to be useful as input signals for the intrusion detection unit originating from the filter device. An intruder may, in particular, attempt to conceal other intrusions with a large number of obvious intrusions or prevent their evaluation, which can be determined accordingly.

In a preferred development, the configuration information describes a security level with associated approval conditions and/or parameters of the approval conditions. Consequently, specifically predetermined configuration information can therefore be used for different security levels so that the corresponding security level can be adapted by a configuration access to the filter device within the data-processing device in a particularly easy manner. Sixteen security levels can be provided, for example, which can therefore be described via two bytes, which gradually loosen the restrictions on the communication data. Depending on the security level, the aforementioned ring buffer of the intrusion detection unit can also be designed with regard to the number of communication data sets kept.

In summary, with regard to the secure element and/or the filter device, at least one of the input signals of the filter device is generated so that it describes at least one of the following information units:

- An initialization error when establishing a communication connection, in particular a missing key from at least one of the communication partners,
- Too many or too few encrypted packets with a partial encryption via a communication connection,
- Communication data not forwarded due to the configuration information, in particular for storage in a ring buffer,
- The exceeding of a permissible communication data throughput and
- Statistical information on communication data not forwarded due to the configuration information.

As indicated in the various examples above, a variety of other useful information is also conceivable as input signals.

The intrusion detection unit uses input signals from at least the secure element and/or the filter device, preferably from several components of the data-processing device, and evaluates them for a possible intrusion, ideally completely independently of the rest of the operation of the data-processing device, which in particular makes it possible to give an intruder the illusion that his activity has not yet been detected. Additional hardware is therefore preferably added within the data-processing device, which comprises at least hardware signal connections from different hardware-based components of the data-processing device to the separated IDS. The use of such a separated IDS avoids the use of pure, vulnerable software and therefore does not add any new points of intrusion because the IDS works via the additional, otherwise unused hardware signal connections and ideally does not interact with the other computing units in a manner that allows for the reception of data or an intrusion. As a result, there is also minimal influence on existing security mechanisms, and it is ensured that the IDS itself is provided in a secure area of the data-processing device. The detection of an intrusion or corruption of the data-processing device cannot be hidden behind an infected part of a data-processing device, particularly a part that has already been taken over; the use of separate, preferably additional, hardware also makes it possible to implement IDS without sacrificing the computing power of the computing units.

The set of intrusion detection rules can but does not necessarily have to be part of the intrusion detection unit. It is also conceivable to provide the set of intrusion detection rules elsewhere, i.e., decentralized, preferably as hardware, for example on the components which supply input data to the intrusion detection unit. A decentralized configuration of the set of intrusion detection rules can further reduce the computing power that must be provided for the intrusion detection unit.

Therefore, the intrusion detection unit is a separate hardware component of the system-on-a-chip, for example an ASIC and/or a separate additional computing unit (CPU/computer core), according to some embodiments of the present disclosure. The intrusion detection unit thus represents a hardware component that is invisible to the computing units, which can carry out its intrusion monitoring in the background in accordance with the set of intrusion detection rules and is unaffected by other processes within the data-processing device. In this variation, neither additional points of intrusion are provided nor is it transparent to an intruder whether or not the intrusion has already been detected. In addition, it should be noted that even if the intruder knew he had been discovered, he would be unable to conceal his actions. This is particularly advantageous in terms of post-intrusion forensics. Furthermore, there is no loss in the computing power of the data-processing unit in this example because no influence is exerted on the computing units that would define the computing power unless a measure requires this, which will be described in more detail below. The hardware signal connection is preferably designed as a signal line here that is specifically designed for the signals to be transmitted and that can only be used in one direction.

In some embodiments, the intrusion detection unit is at least partially designed as a part of the secure element. This facilitates a greater integration and uses hardware provided in a separate security area anyway but does not, however, make it possible to monitor the secure element itself in accordance with the security requirements.

In general, the set of intrusion detection rules which is stored in or can be accessed by the intrusion detection unit can also be understood as an "IDS policy." Depending on the extent to which the input signals have already been pre-evaluated by the data-processing device transmitting these components, the set of intrusion detection rules may only contain rules for logging events and therefore for information filtering purposes and/or for the selection of measures. However, it is also conceivable that the set of intrusion detection rules can provide a basis for classifying an event as an intrusion and thus can describe permitted and not permitted events or assign them to these intrusion categories, potentially in addition to otherwise stored access tables.

While the intrusion detection unit can preferably be provided specifically as a PCIe-IDS, which is particularly useful in motor vehicles, and therefore only accepts input signals from the PCIe-related components of the data-processing device, here the secure element and the filter device, further developments in which the intrusion detection unit receives input signals from all important components of the data-processing device, in particular from all coordination components, is conceivable as well. The monitoring of the input/output operation by receiving the respective input signals has, however, proven to be central since intrusions of the data-processing device must, on the one hand, occur from the outside, but on the other hand the intrusions cause communication to the outside of the data-processing device in essentially all cases so that communication with other data-processing devices is an essential point to be monitored, which is tapped in any case with the configuration according to the disclosure.

In this context, in the case of a partial implementation of the intrusion detection by the generation of corresponding input signals for the intrusion detection unit within the secure element and/or the filter device, a configuration is preferably selected in which the corresponding signal generation for the input signals to be provided to the hardware signal connection is hardware-coded and determined in an unchangeable manner, which significantly increases security. During an evaluation that is mostly made possible by the intrusion detection unit and the set of intrusion detection rules stored therein, particularly an implementation can, as will be discussed in more detail below, also take place in this manner due to the clear separation of the IDS from the computing units/virtual computing components in such a way that dynamic changes are possible, for example, a change in the set of intrusion detection rules.

In one configuration, at least one of the at least one component connected to the intrusion detection unit by means of a hardware signal connection can be designed to pre-evaluate and/or filter the input signals to be transmitted to the intrusion detection unit. This means that part of the intelligence of the IDS can already be employed within the component supplying the input signals, for example, by forwarding to the intrusion detection unit only specific signals that have already been pre-filtered and/or are the result of a pre-evaluation. These component-side parts of the signal processing are preferably determined in the hardware in an unalterably encoded manner for which corresponding methods are already known in prior art in order to avoid a manipulative intrusion at this point. As a result, the authenticity of the input signals forwarded to the intrusion detection unit can be guaranteed, at least as long as no hardware intrusion takes place.

In order to increase security, in some embodiments, the set of intrusion detection rules, i.e., the IDS policy mentioned, is unalterably determined as hardware or is alterable in a secured method, particularly by using secret information which is unalterably encoded as hardware in the data-processing device. For such purpose, it is preferred to allow an alterability secured method since the intrusion detection unit, as has been described, is in any case preferably designed in such a way that computing units or other possibly manipulating components cannot exercise any manipulative access to the intrusion detection unit. By storing secret, in particular also shared, information and a preferably separate configuration connection for the intrusion detection unit, it is possible to update or generally adapt the set of intrusion detection rules in a secure method, for example by using keys as secret information. For this purpose, the secret information can be encoded as part of or specifically connected to the intrusion detection unit, wherein, however, it is also conceivable to use specified and unalterable secret information already provided in the data-processing device. In an alternative embodiment, a one-time specification of the set of intrusion detection rules can also be provided, for example during the production of the data-processing unit and/or with a one-time programmability at a later point in time, for example during the manufacture of a complete entity, in particular a motor vehicle that is supposed to contain the data-processing device.

Different approaches are possible for logging purposes, which can also be used in combination. The intrusion detection unit may, for example, be designed particularly on the basis of the set of intrusion detection rules to log an event classified as an intrusion in an internal and/or an external storage device and/or to forward the event classified as an intrusion to a computing device external to the system-on-a-chip. Therefore, an internal logging in an internal storage device is conceivable, which, for example, can be read out at a later time in order to be able to analyze intrusions that have possibly taken place and to determine data for improving the data-processing unit or the software means used therein. However, it is also conceivable and preferred according to the present disclosure that an external logging is carried out by means of an external storage device and/or an external computing device. In this context, it is, in principle, conceivable, but less preferred, to provide a separate input/output unit for the intrusion detection unit since such specifically provided input/output units take up space and increase the complexity of the data-processing system. It is therefore preferred to use at least one of the at least one interface unit which can also be utilized by the computing unit. For this purpose, for example, hardware output lines from the intrusion detection unit to the computing units and/or the interface unit can be provided, which are preferably unidirectional in order to prevent access to the intrusion detection unit via the hardware output lines. Communication via an interface unit to an external storage device/computing unit can take place, for example, via at least one of the computing units, wherein the safest or most secure computing units/computing unit are/is preferably used when the number of computing units is small or if there is only one computing unit. In other words, for forwarding to the outside, a computing unit is, in that case, addressed which is likely to be taken over at a later stage, if at all, in the event of an intrusion. It may also be advantageous to forward the corresponding output signals used to forward/log an event classified as an intrusion to all computing units of the data-processing device since it is unlikely that all of these computing units have already been compromised, which essentially ensures the forwarding of the output signal via the interface unit.

For the forwarding to the external computing device and/or the external storage device, a data-processing device identifier is preferably added to the event data describing the event classified as an intrusion, i.e., particularly to the output signal. In this manner, it can also be determined in the external storage device/external computing device to which data-processing device the event data is referring.

When evaluating the input signals, it is generally preferred that the intrusion detection unit is designed to determine event data describing a cause of an event classified as an intrusion and/or describing the type of event, with particularly also data describing the time of the event being determined as well. With regard to logged events that are to be evaluated and/or with regard the adoption of measures, it is therefore advantageous to know, in the case of an event, which component of the data-processing device has done something that has been classified at least as a potential intrusion. The most recently rejected communication data sets, as described, also represent a particularly useful part of the event data. If a time stamp is available, for example, in the input signals, it seems prudent to also add the time stamp to the event data. For this purpose, it is advantageous to not provide the intrusion detection unit itself with a timer because it would have to be synchronized with the remaining timers of the data-processing device, which could constitute a possible point of intrusion into the intrusion detection unit.

In addition to the realization of an IDS (intrusion detection system), the execution of protective measures as measures for at least some of the events classified as intrusions also results in the realization of an IPS (Intrusion Prevention System), i.e., combined in an IDPS (Intrusion Detection and Prevention System). In this case, the intrusion detection unit is additionally designed as an intrusion prevention unit that triggers at least one protective measure for at least some of the events classified as an intrusion.

In this context, the measure signals describing the protective measures can be transmitted via hardware measure connections to the components of the data-processing device affected by the measure and/or to all computing units. These hardware measure connections are preferably designed to be unidirectional from the intrusion detection unit to the corresponding components of the data-processing device in order to prevent the components from accessing the intrusion detection unit. Protective measures may include, for example, a deactivation and/or resetting of computing units and/or further components of the data-processing device and/or a modification of operating parameters, for example, clock frequencies and/or access permissions. A shutdown and restart of certain applications (if the system is only partially corrupted) are also conceivable. The advantage of data-processing systems such as those in motor vehicles is that other data-processing devices can also carry out the protective measures, which means that they can be carried out remotely from a system corrupted by an intruder. Distributed systems therefore offer the possibility of an equally distributed IDPS as far as protective measures are concerned, which can be advantageously implemented as complete entities, particularly in motor vehicles. Protective measures can therefore be implemented there by other control devices, for example. The hardware output lines which make it is possible to log on an external computing device and/or storage device can be used.

In general, however, many protection mechanisms are already provided by the secure element and the filter device so that the intrusion detection unit can be implemented as a simple IDS, which means that the measures have logging purposes.

The data-processing device can also be implemented as a system-on-a-chip (SoC). In this context, reference is also made in particular to the explanations in the already mentioned, post-published DE 10 2017 219 242.9 in which the implementation of an intrusion detection unit of an IDS is described as part of a system-on-a-chip. The present disclosure can therefore also be used for such highly integrated configurations.

A complete entity according to the present disclosure can be formed in that its data-processing system comprises at least two data-processing devices according to the disclosure, which communicate with one another in particular as "endpoints" via PCIe. The corresponding authentication, encrypted communication and filtering processes can then take place between the different data-processing devices according to some embodiments of the present disclosure.

A complete entity with at least two data-processing devices can be provided in another embodiment of the present disclosure using the same inventive concept with the data-processing devices each having at least one computing unit and at least one interface unit, which use a packet-based communication protocol, in particular PCI Express. The complete entity also has a bridge device connecting the data-processing devices as endpoints with at least one interface unit of the communication protocol. In this case, such a complete entity may be characterized by the fact that the bridge device further comprises an intrusion detection unit, in particular as hardware, which is connected via at least one signal connection, preferably a hardware signal connection, with at least one filter device of the at least one interface unit. The intrusion detection unit also evaluates input signals related to a rule infringement of a set of intrusion detection rules which need to be logged and/or responded to with at least one measure. The filter device, at least part of which is hardware, is designed to forward only the communication data meeting at least one approval condition, which evaluates the at least one property of the communication data containing user data, from the at least one interface unit to at least one additional component of the data-processing device, according to configuration information predetermined in the target data-processing device and containing at least one approval condition. At least one intrusion detection rule relates to the violation of at least one approval condition.

Instead of or in addition to an IDS in "endpoints," that is to say the data-processing devices themselves, the IDS can also be implemented in a bridge device, for example a switch or a multiplexer/de multiplexer and/or a hub, if the filtering of the data with the filter device is implemented within the bridge device. The communication is therefore monitored at a central point, in particular a point that is invisible to the data-processing devices and where corresponding filter device are provided as well. When used in such a central bridge device, there is, in particular, the possibility of merging input signals from different communication connections between data-processing devices and evaluating them in summary with regard to a set of intrusion detection rules that is particularly adapted to the approval conditions, which allows for a more precise and reliable classification of events as intrusions or even the type the intrusion.

The advantages already mentioned with regard to the data-processing device continue to apply analogously to both variants of the complete entity. Corresponding embodiments can be transferred as well.

Another aspect of the present disclosure provides a motor vehicle as a complete entity with at least one data-processing device being a control device. Modern motor vehicles usually have complicated data-processing systems which are supposed to meet the highest requirements, particularly with regard the control devices involved. It must be noted, however, that the data-processing devices in a motor vehicle as the complete entity do not necessarily have to be control devices. It is quite conceivable to integrate other data-processing devices, for example, sensors, display devices, operating elements, bridge devices, and the like as well. An integration of a backend server is also conceivable.

Especially in motor vehicles as well as in complete entities in general, it may be advantageous if the key information is specific to the complete entity in order to increase the security even more. The key information can then be made available by a manufacturer in a database, for example, in order to be able to specifically control expansions and/or replacements with respect to the data-processing systems of the complete entities.

Furthermore, in the case of data-processing systems representing distributed systems, at least one protective measure is taken by an external, further data-processing device when an IDPS is implemented by the intrusion detection unit. In this way, the corrupted data-processing device is bypassed in the protective measures.

Finally, the present disclosure also relates to a method for operating a data-processing device or a complete entity presented in this disclosure, wherein the filter device only forwards communication data which meets at least one approval condition and the intrusion detection unit evaluates input data received via the signal connection with regard to a rule infringement in the set intrusion detection rules. All statements regarding the data-processing device and the complete entities can be transferred analogously to the method according to the present disclosure in such a way that the advantages mentioned can be achieved.

Further advantages and details of the present disclosure will become apparent from the exemplary embodiments described below and with reference to the drawings.

FIG. 1 shows a first embodiment of a complete entity 1 according to some embodiments of the present disclosure. By way of example, it comprises the two data-processing devices 2 shown, each having have a computing unit 3, for example a CPU. The computing unit 3 can, for example, provide a rich execution environment with an operating system that can manage the interrupt handling, drivers, applications, and the like. Of course, at least one of the at least one computing unit 3 can also form a Trusted Execution Environment (TEE). The data-processing devices 2 also comprise at least one storage device 4, which can be implemented within the computing unit 3 as well.

It should be noted at this point that the data-processing devices 2 can be at least partially systems-on-a-chip; in addition, at least some of the data-processing devices 2 can be designed as control devices of a motor vehicle as a complete entity 1.

The data processing devices 2 are to be able to communicate with one another via a PCIe (Peripheral Component Interconnect Express) communication connection 5 for which reason they each have an interface unit 6, which can be designed as a PCIe microchip and which has an interrupt and user data connection to the computing unit 3. It is not essential whether the communication connection 5 is established directly or via a bridge device 7, which is only indicated here and which can be designed as a switch, hub, multiplexer/demultiplexer or the like. A special configuration of the bridge device 7 with regard to the second embodiment to be discussed later will be addressed later.

The communication connection 5 therefore uses the PCIe communication standard for the high-speed data transmission.

As part of an authentication arrangement, an encryption/decryption device 8 produced by hardware is integrated in the interface unit 6, which in this case can encrypt or decrypt the user data for the communication session on the basis of a negotiated session key. The encryption/decryption device must be assigned here to the transaction layer of the PCIe communication protocol. In other words, the encryption/decryption is applied to the data to be transported physically (TLPs—Transaction Layer Packages).

The session key is negotiated via a further component of the authentication arrangement, namely a secure element 9, which in this case is provided as a separate microchip, specifically as a trusted platform module (TPM), but can also be provided as a trusted zone or secure element on a microchip realizing the computing unit 3 and/or the interface unit 6. It is essential that both the operating system of the secure element 9 and key information 10 stored in the secure element 9 are hardware-coded and thus unalterable, wherein, in the present case, the key information 10 comprises at least one base key which is identical for both data-processing devices 2. The secure element 9 therefore forms a trusted runtime environment, i.e., a so-called Trusted Execution Environment (TEE) which cannot be accessed in a controlling or influencing manner particularly by the respective computing unit 3.

The trusted operating system of the secure element 9 executes all security-relevant calculations, in this case particularly both the management of the key information 10 and the negotiation of a session key, which is subsequently determined as "shared information" on the basis of the key information 10 so that encrypted communication between the data-processing devices 2 is possible only in the event of corresponding or matching key information 10, which constitutes an authentication. If an encryption is possible, both data-processing devices 2 thus know that the respective communication partner is authorized, which means that a reciprocal authentication is provided. Added and/or modified data-processing devices which do not have the key information 10 can thus be detected and identified as an unauthorized device. It is also conceivable to provide an authentication process separate from the key negotiation, for example upstream from the key negotiation as a prerequisite for the negotiation. As a result, the key information does not necessarily have to be included in the session key or its negotiation.

Since a symmetric base encryption is present in this case, it is also possible to use a plurality of base keys which can be derived particularly from a root key which never leaves the secure element 9. In this manner, different base keys for different models of the complete entity 1, different regions and/or different time periods can be created to further increase security. It is further preferred if the base key (serving particularly as a root key) of the key information 10 is complete entity-specific, i.e., if a separate, individual root key and thus separate, individual key information 10 is present for each complete entity 1.

It should also be noted that the respective secure elements 9 have at least one protection mechanism which makes it at least difficult to access the key information 10 by manipulating the secure element 9 itself.

In this case, a filter device 11, which checks communication data received on the basis of configuration information against various approval conditions and only forwards the user data included in the communication data to the further components of the data-processing device 2, here the computing unit 3 and the storage device 4 are technically integrated in the hardware of the interface unit 6, i.e., if they are provided in the corresponding microchip in a fixed manner. At least one of the approval conditions evaluates a property of the user data contained in the communication data with further approval conditions also being able to refer to the communication partner and/or the communication connection 5 itself.

The filter device 11 can only be designed from within the data-processing device 2, in the present case exclusively by the computing unit 3 and/or the intrusion detection unit 14, which will be explained below. A corresponding, separate configuration channel may be provided for this purpose, but it is also possible to use a communication interface of the interface unit 6, which is used for configuration purposes regardless. In FIG. 1, the configuration access is indicated for the computing unit 3 by an arrow 12. A configuration for producing the complete entity 1 is also conceivable. In the case of motor vehicles, for example, a provision can be made for using previously known configuration information based on the known set of commands/messages/signals, which no longer changes, except for interventions by the IDS 13 described below.

Each of the data-processing devices 2 furthermore comprises the intrusion detection system or IDS 13, which includes an intrusion detection unit 14 implemented as separate hardware and in which a set of intrusion detection rules 15 is stored. In the present case, the IDS 13 relates to the PCIe communication protocol, which is used for the communication connection 5 and thus advantageously summarizes the monitoring that is meaningful in this regard in a centralized manner. The set of intrusion detection rules 15 makes it possible to classify events described by input signals as an intrusion or no intrusion, but it is also, of course, classifies various intrusions or their criticality in detail.

The intrusion detection unit 14 receives the input signals from the filter device 11 and the secure element 9 via hardware signal connections 16, which are unidirectional and do not allow controlling access to the intrusion detection unit 14, which therefore passively monitors the PCIe communication already protected by the filter device 11 and the secure element 9 monitors and, if necessary, at least logs intrusions and may even take further measures.

The input signals may be generated directly as hardware interrupts and the like and forwarded to the intrusion detection unit 14 in an unfiltered/unevaluated manner in order to provide as few intrusion opportunities as possible. However, configurations in which a pre-evaluation and/or filtering is performed by one of the components supplying the input signals in order to reduce the data load for the intrusion detection unit 14 and to implement the unit in a smaller/less complex manner are conceivable as well. Such a pre-evaluation and/or filtering preferably takes place on the part of the filter device 11 or the secure element 9 by using unalterable hardware.

The set of intrusion detection rules 15 can be stored, unalterably encoded in hardware, i.e., as a one-time determination, in the intrusion detection unit 14, wherein a basically alterable configuration is also conceivable, in which case secret information, for example, the key information 10, stored unalterably in the respective data-processing device 2, is used to carry out an authentication in the case of a change.

The set of intrusion detection rules 15 can define classifications, for example when and how critical an intrusion is. The set of intrusion detection rules 15 can further describe how to deal with detected intrusions, i.e., what is supposed to happen when at least one event is classified as an intrusion. The measures range from different logging actions up to possibly provided protective measures, wherein, in the latter case, the intrusion detection unit 14 is also designed as an intrusion prevention unit, resulting overall in an IDPS 13 (Intrusion Detection and Prevention System). Logging can occur by means of an internal storage device to which a corresponding hardware output line leads, but it is also conceivable to communicate event data describing an event to outside the data-processing device 2, for which purpose a separate input/output unit for the intrusion detection unit 14 can be provided, or communication can take place via the at least one computing unit 3 and/or the interface unit 6.

It is thus possible to forward the event data to an external storage device and/or computing device 18 for logging and/or for further processing purposes, particularly with regard to protective measures, as indicated by the arrow 17. The event data, which preferably describes a cause of an event classified as an intrusion, the type of event and the time of the event are supplemented by an identifier of the data-processing device so that the external storage device and/or the computing device 18 can make a corresponding allocation.

In the present case, the input signals ultimately describe authentication and/or encryption errors (secure element 9) or rejected communication data (filter device 11). Since the input signals that can be used in practice result from the way these components work, this is first explained in more detail below.

For the reciprocal authentication, for example, both data processing devices 2 can be initialized, for example, booted up, whereupon both the computation unit 3 and the security unit 9 are started as well. This is also regarded as the start of a communication session so that in a following step, the secure elements 9 negotiate a session key for the communication session via the communication connection 5, wherein here, too, an encryption can already occur by using the key information 10 and the respective encryption/decryption device 8. In any case, the session key is negotiated by using the key information 10 or is derived therefrom.

In this sense, this step can also be understood as an authentication process because either the negotiation of the session key will fail immediately or the communication with encrypted data will fail later, thus clearly indicating that the communication partner is not correctly authenticated. Corresponding information is already eminently suitable as input signals for the intrusion detection unit 14, which is why the operating system of the secure element, which is preferably hardware, is also designed to forward such input signals to the intrusion detection unit 14 via the corresponding hardware signal connection 16.

Figures 2, 3:
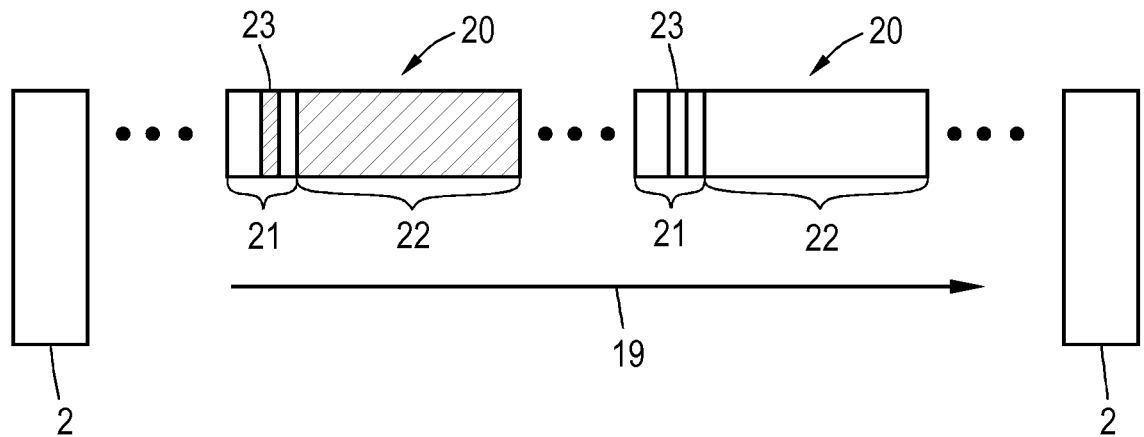
FIG. 2 shows a diagram for partial encryption, according to some embodiments of the present disclosure.
FIG. 3 shows a possible definition of security levels, according to some embodiments of the present disclosure.

In a final step, the session key can then be used to communicate in an encrypted manner. In such case, it is not necessarily required to encrypt each user data packet, in this case specifically a TLP (Transaction Layer Packages), but a partial encryption is also conceivable as shall be explained in more detail by FIG. 2. It indicates the data transport 19 between the data-processing devices 2, wherein two different user data packets 20 (e.g., TLPs) are shown. Each of the user data packets 20 comprises at least one header 21 and user data 22 (payload). The header 21 now contains one information unit 23, for example an encryption bit which, when it is set, indicates that the user data 22 is encrypted (cf. hatching in the left user data packet 20) and if it is not set, indicates that the user data 22 is not encrypted, i.e. the right user data packet 20 and the correspondingly missing hatching.

The rate of the user data packets 20 containing encrypted user data 22 can also be adapted dynamically, for example on the basis of a desired data transfer rate.

The partial encryption or corresponding deviations likewise form a basis for useful input signals, for example if too many or too few encrypted user data packets 20 arrive. The input signals for the intrusion detection unit 14 can indicate this.

The use of the filter device 11 will now be explained in more detail. In a first step, communication data, in the present case as data packets, which includes user data 22 (payload) and a header 21, is received. After the physical layer and the data link layer have been passed through, the communication data arrive at the transaction layer where the data packets 20 (Transaction Layer Packets—TLP) encounter the filter device 11. The corresponding filtering, i.e., the checking of all approval conditions for each incoming data packet, takes place in a second step. If it is determined that at least one of the approval conditions is not met, the data packet is discarded and the next data packet 20 is returned to the first step. If, however, all the approval conditions are met, the communication data is processed in the interface unit 6 as usual and passed on to the further components 3, 4 of the data-processing device 2.

The intrusion detection unit 14 uses information about rejected user data packets 20 (or other communication data sets) as input signals in order to determine whether an intrusion has occurred or can be detected. If this is the case, the filter device 11 can also be redesigned via the computing unit 3, arrow 12, or directly from the intrusion detection unit 14, arrow 25, for example, as a protective measure. It is possible, for example, to tighten the approval conditions or to deactivate the communication connection 5 entirely.

In the present exemplary embodiment, certain security levels are defined for this purpose with assigned configuration information that describes the approval conditions. This is shown in more detail in table 24 in FIG. 3. Each row corresponds to a security level L1, L2, . . . P1-P10 are parameters of approval conditions. P1 and P2 describe the permitted serial numbers of communication connections whereas P3 and P4 describe permissible serial numbers of communication partners. P5-P10 refer to content-related approval conditions. P5 and P6 describe the range of permissible function types (function classes), P7 and P8 the permissible storage areas of the at least one storage device 4 into which data may be written, and P9 and P10 the minimum length and the maximum length of user data units. Column P11 pertains to the maximum permissible message throughput. For example, 200 messages/second are permitted in the L1, only 30 messages/second in the L2, etc. User data units can correspond to control commands, but other user data 22 can also be treated by the filter device 11.

As can be seen, the security level L1, for example, cannot impose any restrictions on communication while security level L16 only allows signals on the first communication connection for communication partner No. 16 and the first function class. The target storage area and the amount of data are also clearly defined and limited.

A suitable security level L1, L2, . . . can, as described, be selected dynamically by the computing unit 3 and/or the intrusion detection unit 14.

Input signals provided by the filter device 11 to the intrusion detection unit 14 particularly advantageously include, at least for logging purposes, user data packets 20 (e.g., TLPs) that were rejected on the basis of the approval conditions, for which purpose a ring buffer 26 (in FIG. 1) is provided in the intrusion detection unit 14, in which a certain number of the most recent communication data sets that were not forwarded, in particular user data packets 20, for example the last 100, can be stored. In this case, an evaluation can take place directly by the set of intrusion detection rules 15, or, in the case of an analysis after a successful intrusion, the communication data sets stored there can be accessed in order to obtain information about the intrusion that is as accurate as possible, for example from the external storage device and/or computing device 18. In particular at higher security levels, this functionality can also be switched off entirely due to the large number of rejected messages, or the ring buffer 26 can be expanded accordingly, if possible. In particular, it is therefore possible to select the number of communication data sets to be kept in the ring buffer 26, in particular rejected user data packets 20, depending on the current security level of the filter device 11.

Input signals sent from the filter device 11 to the intrusion detection unit 14 can furthermore contain statistical information about rejected communication data, for example the relative number of rejected user data packets 20, and/or the respectively violated approval conditions in order to analyze the intrusion situation as precisely as possible on the basis of the set intrusion detection rules 15, which of course is matched to the approval conditions. In particular statistical information can also be cyclically provided to the intrusion detection unit 14 in order to be evaluated there, for example with regard to a message throughput/communication data set (cf. also P11 in FIG. 3). If the configuration information is known in the intrusion detection unit 14, the evaluation can also take place there on the basis of the statistical information.

In summary, the intrusion detection unit 14 can therefore analyze the following malfunctions/potential intrusions or related information based on the input signals: problems with the initialization, for example missing sent or received session keys, too many or too few encrypted user data packets 20 when using partial encryption (cf. explanation of FIG. 2), communication data sets that do not pass through the filtering device 11 and in particular are stored in the ring buffer 26, and statistical information about infringements of the approval conditions depending on the security level.

It should be pointed out that, in an alternative embodiment, it is also possible to provide the intrusion detection unit 14 as part of the secure element 9 in which case its input signals may then no longer be considered with sufficient security.

Figure 4:
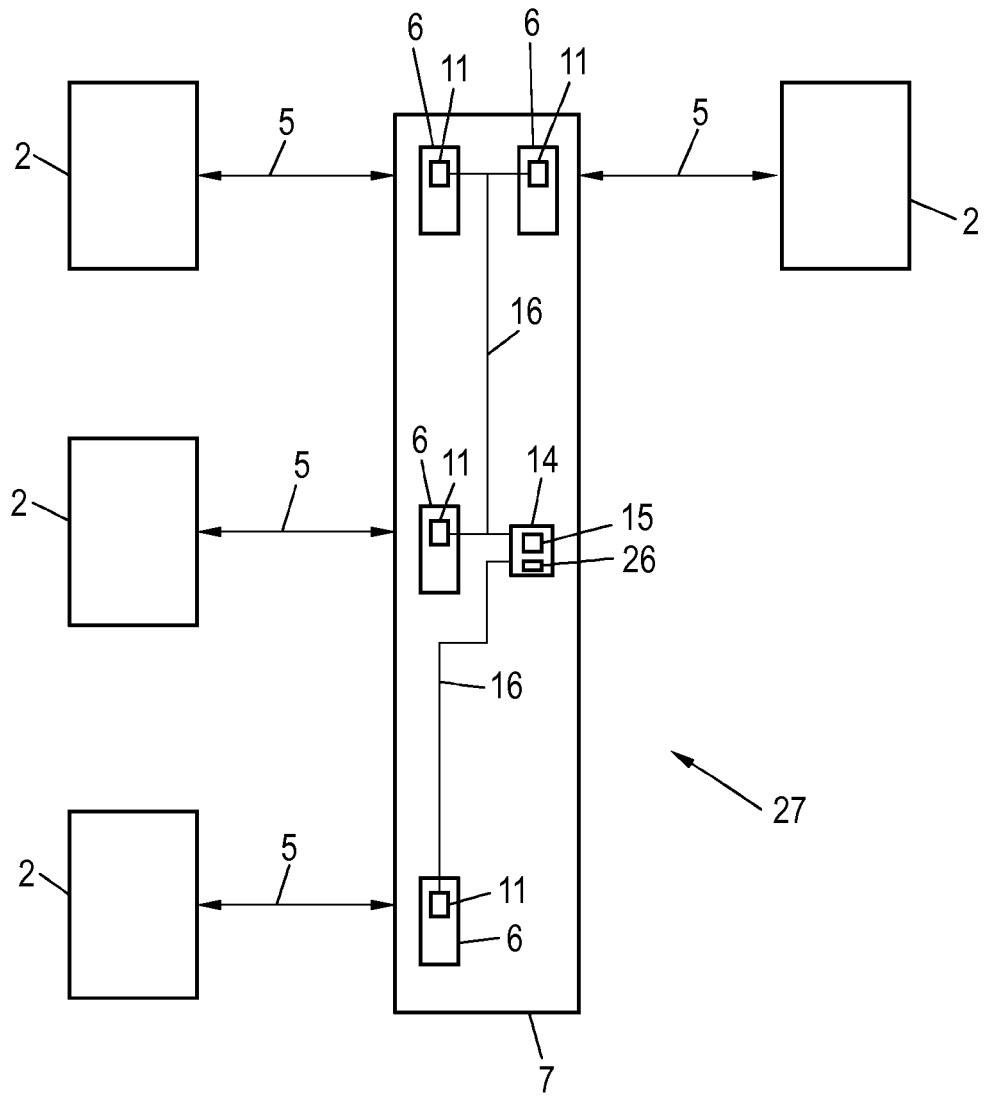
FIG. 4 shows a schematic diagram of a second complete entity, according to some embodiments of the present disclosure.

FIG. 4 shows a second embodiment of a complete entity 27 according to the disclosure in which the data-processing devices 2 can be designed as shown in FIG. 1 but does not necessarily comprise an intrusion detection unit 14 and a filter device 11. In the present case, the filter device 11 is provided in any case within the interface units 6 of the bridge device 7, which also has an intrusion detection unit 14 with a corresponding set of intrusion detection rules 15 and optionally at least one ring buffer 26 for rejected communication data sets. The filter device 11 is in turn connected to the intrusion detection unit 14 via hardware signal connections 16 with the set of intrusion detection rules 15 in this case also being able to carry out analyzes across communication connections 5 on the basis of rejected communication data sets or generally input signals describing them.

Figure 5:
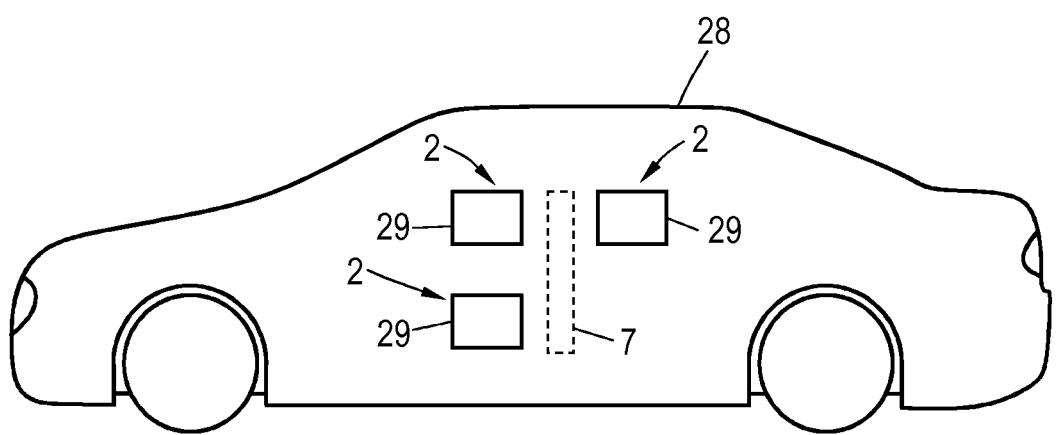
FIG. 5 shows a motor vehicle as a complete entity, according to some embodiments of the present disclosure.

Finally, FIG. 5 schematically shows a complete entity designed as a motor vehicle 28, which can be designed just like the complete entity 1 or the complete entity 27. A large number of control devices 29 are provided as data-processing devices 2 although other data-processing devices 2 can also be present within the motor vehicle 28. The data-processing devices 2 or control devices 29 can be at least partially designed as systems-on-a-chips. The data-processing devices 2 of the motor vehicle 28 communicate with one another via PCIe with the security measures and IDS/IDPS 13 described above being provided, specifically in the bridge device 7 and/or at least some of the data-processing devices 2.

The invention claimed is:

1. A data-processing device configured as a system-on-a-chip, comprising:
   a computing unit configured as a first hardware component on the system-on-a-chip;
   an interface unit configured as a second hardware component on the system-on-a-chip, comprising:
      a communication connection with a packet-based communication protocol; and
      a filter device, wherein
         at least part of the filter device is made from hardware, and
         the filter device is designed to forward, to an additional component of the data-processing device, communication data meeting an approval condition, wherein
            the approval condition evaluates a property of the communication data, and
            the approval condition is contained in a configuration information predetermined in the data-processing device;
   a secure element, realized as a Trusted Execution Environment of an authentication arrangement related to the communication protocol; and
   an intrusion detection unit configured as a third hardware component on the system-on-a-chip, wherein the intrusion detection unit is further configured to:
      connect with the filter device and/or the secure element via a signal connection; and
      evaluate an input signal received via the signal connection for a rule infringement of an intrusion detection rule, wherein
         the intrusion detection rule is logged and/or responded to with a measure; and
         the intrusion detection rule relates to a violation of the approval condition and/or to an authentication error.

2. The data-processing device according to claim 1, wherein the packet-based communication protocol of the communication connection comprises a PCI (Peripheral Component Interconnect) Express.

3. The data-processing device according to claim 1, wherein the signal connection is a hardware signal connection.

4. The data-processing device according to claim 1, wherein the interface unit further comprises an encryption/decryption device for the authentication arrangement, wherein the encryption/decryption device is configured to:
encrypt the communication data for transmission via the communication connection to another data-processing device, wherein an encryption is applied to the communication data in a communication layer of the communication protocol; and
decrypt the communication data received via the communication connection from another data-processing device, and
wherein the encryption/decryption device comprises a hardware that cannot access the computing unit and/or the secure element.

5. The data-processing device according to claim 4, wherein the secure element, logically isolated from the computing unit, comprises:
a hardware-coded key information, wherein the communication data for transmission is encrypted by the encryption/decryption device based on the hardware-coded key information.

6. The data-processing device according to claim 1, wherein:
the secure element generates the input signal for the intrusion detection unit; and
the secure element is at least partially formed as hardware.

7. The data-processing device according to claim 1, wherein the input signal for the intrusion detection unit describes an authentication error and/or an encryption error.

8. The data-processing device according to claim 1, wherein the intrusion detection unit is at least partially configured as a part of the secure element.

9. The data-processing device according to claim 1, wherein the input signal for the intrusion detection unit descriptively generates a piece of information comprising:
an initialization error when establishing the communication connection;
encrypted packets with partial encryption via the communication connection;
further communication data not forwarded due to the configuration information;
an exceeding of a permissible communication data throughput; and
statistic information on the further communication data not forwarded due to the configuration information.

10. The data-processing device according to claim 9, wherein the initialization error comprises a missing key from a communication partner.

11. The data-processing device according to claim 9, wherein the further communication data not forwarded due to the configuration information is stored in a ring buffer.

12. The data-processing device according to claim 1, wherein the computing unit and/or the intrusion detection unit is designed to reconfigure the filter device when an intrusion is detected.

13. The data-processing device according to claim 1, wherein the intrusion detection unit is configured to implement an Intrusion Detection and Prevention System (IDPS) with at least one protective measure carried out by another data-processing device external to the data-processing device.

14. A complete entity, comprising:
at least two data-processing devices, each comprising at least one computing unit; and
a bridge device configured as a system-on-a-chip and comprising:
at least one interface unit using a packet-based communication protocol connecting the at least two data-processing devices as end points; and
an intrusion detection unit, wherein:
the intrusion detection unit is a hardware;
the intrusion detection unit is connected via at least one signal connection with a filter device of the at least one interface unit, wherein the at least one signal connection is based on hardware; and
the intrusion detection unit evaluates an input signal received from the filter device with regard to an infringement of a set of intrusion detection rules that needs to be logged and/or responded to with at least one measure, wherein:
at least part of the filter device is hardware; and
the filter device is designed to forward communication data meeting at least one approval condition, wherein:
the at least one approval condition evaluates a property of the communication data received by the at least one interface unit from an interface unit of a target data-processing device; and
at least one intrusion detection rule relates to a violation of at least one approval condition.

15. The complete entity according to claim 14, wherein the communication protocol is a PCI (Peripheral Component Interconnect) Express.

16. The complete entity according to claim 14, wherein the intrusion detection unit comprises a ring buffer configured to store the communication data not forwarded by the filter device.

17. A method for operating a data-processing device configured as a system-on-a-chip, comprising:
receiving, by an interface unit of the data-processing device that is configured as a first hardware component on the system-on-a-chip, communication data via a communication connection with a packet-based communication protocol;
forwarding, by a filter device of the interface unit, the communication data that meets at least one approval condition, to an additional component of the data-processing device, wherein forwarding the communication data by the filter device comprises:
evaluating, using the at least one approval condition, at least one property of the communication data, wherein the at least one approval condition is contained in a configuration information predetermined in the data-processing device; and
evaluating, by an intrusion detection unit configured as a second hardware component on the system-on-a-chip, an input signal with regard to a rule infringement of a set of intrusion detection rules, wherein evaluating the input signal comprises:
receiving the input signal from the filter device and/or a secure element via a hardware-based signal connection, wherein the secure element is realized as a Trusted Execution Environment of an authentication arrangement related to the communication protocol; and logging and/or responding to the set of instruction detection rules with at least one measure, wherein at least one instruction detection rule relates to a violation of the at least one approval condition and/or an authentication error.

18. The method according to claim 17, wherein receiving the communication data comprises receiving via the communication connection with a PCI (Peripheral Component Interconnect) Express.

19. The method according to claim 17, further comprising:
    encrypting the communication data by an encryption/decryption device in the interface unit for the authentication arrangement, wherein encrypting the communication data comprises:
        applying an encryption to the communication data in a communication layer of the communication protocol;
        transmitting, via the communication connection, the encrypted communication data to another data-processing device; and
        decrypting the communication data received via the communication connection from another data-processing device.

20. The method according to claim 19, wherein encrypting the communication data further comprises encrypting based on a hardware-coded key information generated by the secure element, the secure element logically isolated from a computing unit of the data-processing device configured as a third hardware component on the system-on-a-chip.

* * * * *